J. B. ZIMMERMAN.
CORN HUSKING MACHINE.
APPLICATION FILED APR. 12, 1916.
1,248,591.
Patented Dec. 4, 1917.
3 SHEETS—SHEET 2.
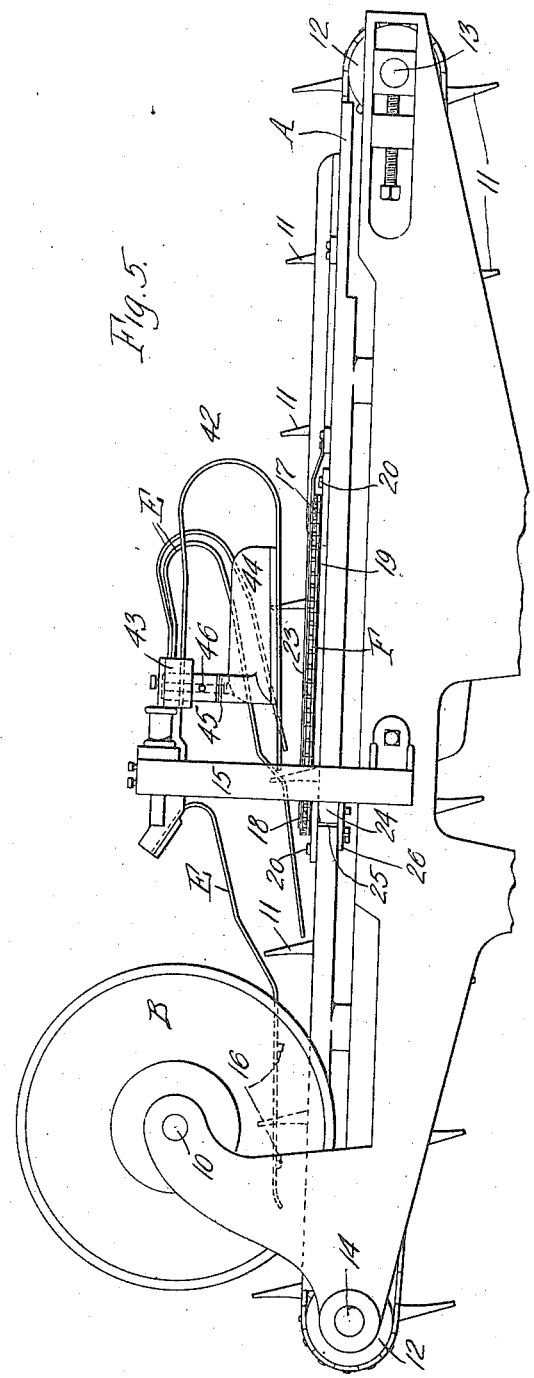
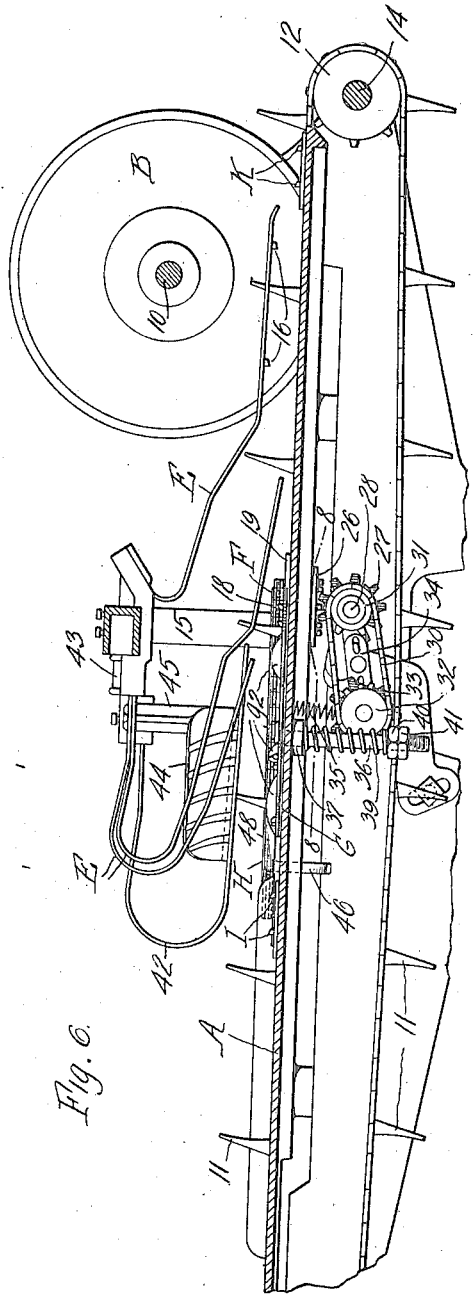
Inventor
John B. Zimmerman
by Wilhelm & Parker
Attorneys.

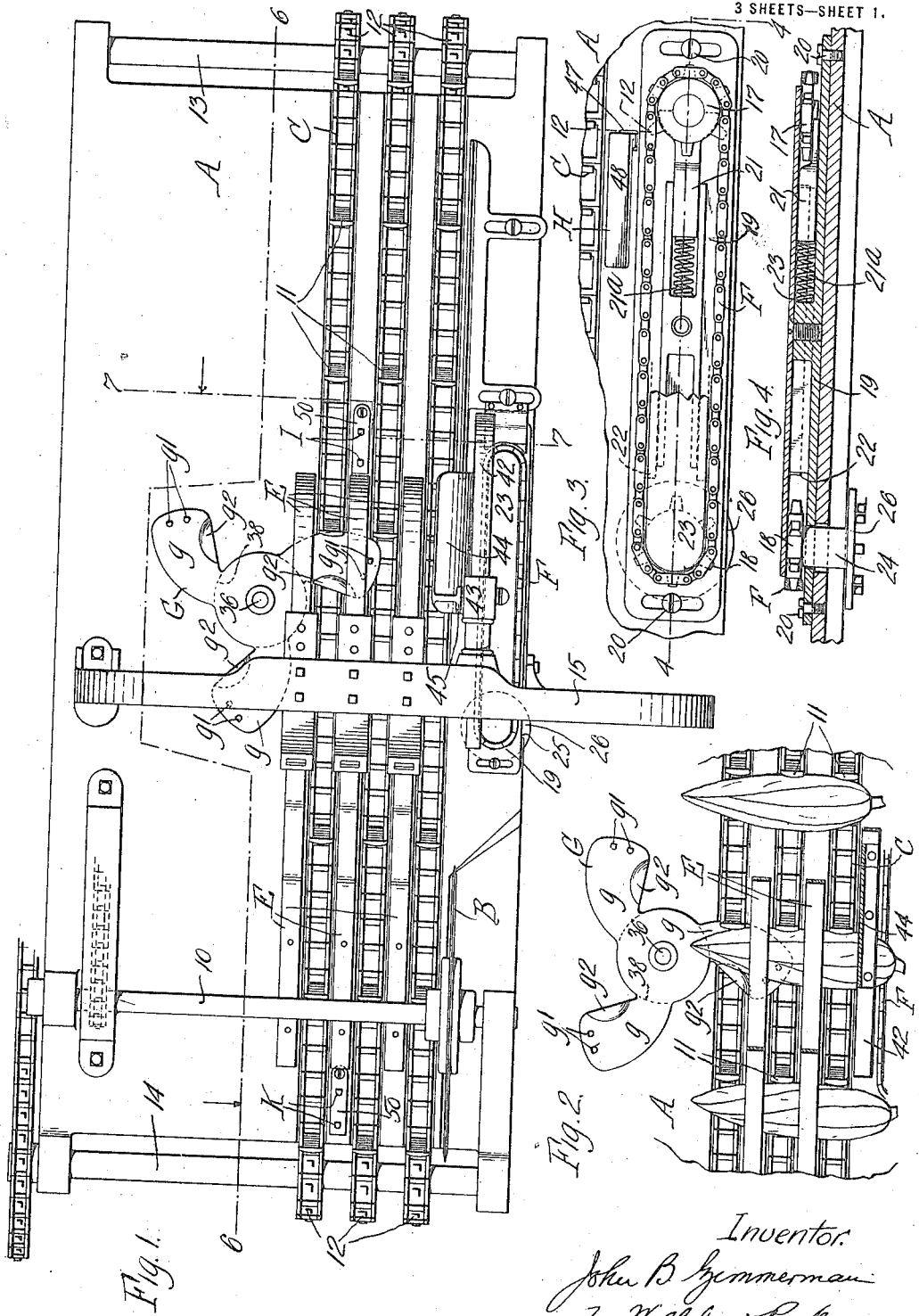
J. B. ZIMMERMAN.
CORN HUSKING MACHINE.
APPLICATION FILED APR. 12, 1916.
1,248,591.
Patented Dec. 4, 1917.
3 SHEETS—SHEET 1.
Inventor:
John B Zimmerman
By Wilhelm & Parker.
Attorneys.

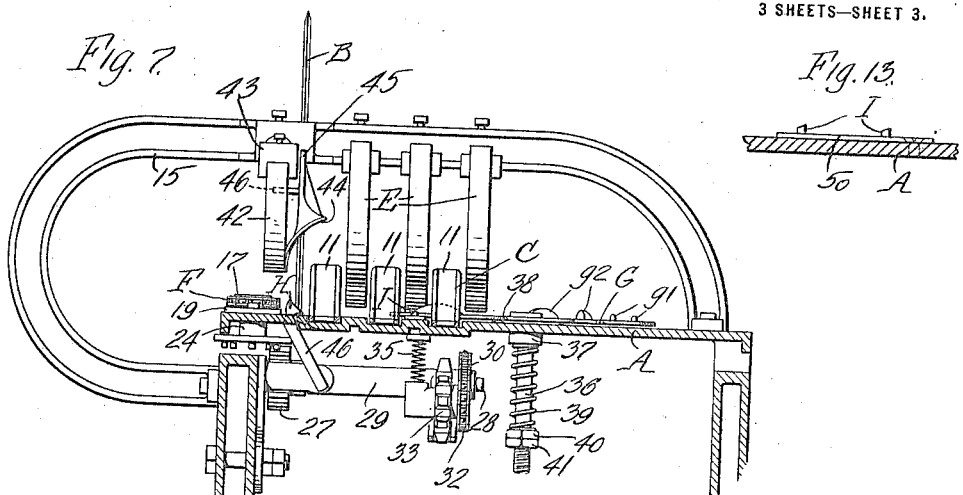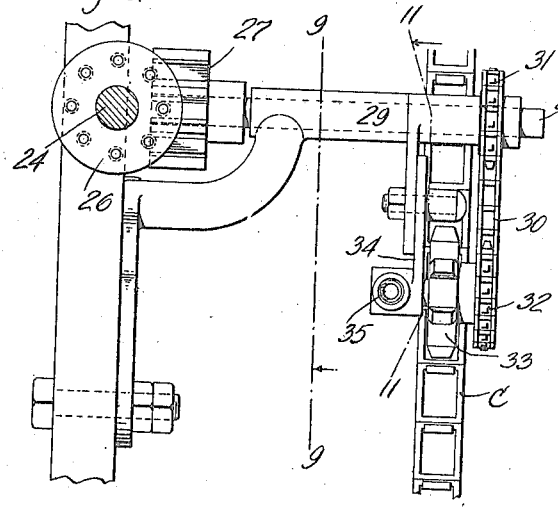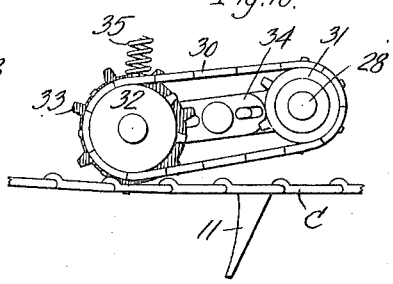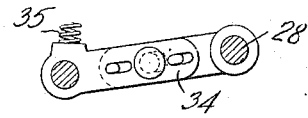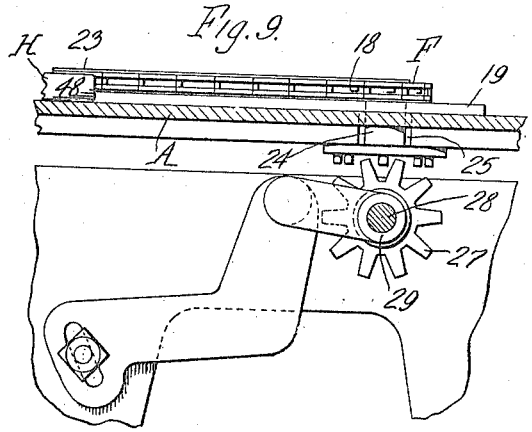

UNITED STATES PATENT OFFICE.

JOHN B. ZIMMERMAN, OF BUFFALO, NEW YORK, ASSIGNOR TO INVINCIBLE GRAIN CLEANER CO., OF SILVER CREEK, NEW YORK.

CORN-HUSKING MACHINE.

1,248,591.

Specification of Letters Patent.

Patented Dec. 4, 1917.

Application filed April 12, 1916. Serial No. 90,720.

*To all whom it may concern:*

Be it known that I, JOHN B. ZIMMERMAN, a citizen of the United States, residing at Buffalo, in the county of Erie and State of New York, have invented a new and useful Improvement in Corn-Husking Machines, of which the following is a specification.

This invention relates to improvements in green corn husking machines of that kind in which a traveling feed conveyer to which the ears of corn are fed by hand moves the ears forwardly in a sidewise position past a butt cutter or knife which cuts off the butts or stalks and severs the husks at the butt end of the ear before the ears are delivered to the husking instrumentalities. It is desirable to cut the butts at such a point at the shoulder of the ear as to properly sever the husks without cutting into the kernels and wasting the corn or causing it to sour. Mechanisms have been devised for use in corn husking machines intended to operate automatically when the ears are not placed by hand in proper position relative to the butt cutter, to move the ears transversely of the direction of travel of the feed conveyer to such a position as to cause the butts to be severed at the proper points.

The object of this invention is to improve such ear-placing mechanisms for corn-husking machines in the several particulars hereinafter described and set forth in the claims for the purpose of insuring an accurate and reliable placing of the ears in proper relation to the butt cutter.

In the accompanying drawings:—

Figure 1 is a plan view of the ear conveying, butt-cutting and ear-placing mechanism of a corn husking machine embodying the invention.

Fig. 2 is a fragmentary plan view thereof, showing a different position of the ear-placing device.

Fig. 3 is a plan view, enlarged, of the butt gage, the cover plate thereof being removed to expose the underlying parts.

Fig. 4 is a sectional elevation thereof in line 4—4, Fig. 3.

Fig. 5 is a side elevation of the conveying, butt-cutting and ear-placing mechanism.

Fig. 6 is a sectional elevation thereof in line 6—6, Fig. 1, looking in the direction of the arrow.

Fig. 7 is a transverse sectional elevation thereof in line 7—7, Fig. 1.

Fig. 8 is a fragmentary plan view, partly in horizontal section, in line 8—8, Fig. 6, showing the gage driving mechanism.

Fig. 9 is a sectional elevation thereof in line 9—9, Fig. 8.

Fig. 10 is a side elevation of the driving mechanism shown in Fig. 8.

Fig. 11 is a sectional elevation thereof in line 11—11, Fig. 8.

Fig. 12 is a sectional elevation in line 12—12, Fig. 3, showing the device for lifting the stalks to the gage.

Fig. 13 is a sectional elevation showing one of the ear-turning devices.

A represents the feed table of a green corn husking machine, B a rotary butt cutter or knife for cutting the butts from the ears of corn, and C a conveyer for moving the ears of corn past the butt cutter. In the construction shown, the butt cutter B consists of a circular knife secured to a horizontal driven shaft 10 and coöperating with an adjacent edge of the table for severing the stalks or butts. The feed conveyer comprises a plurality of parallel endless chains having fingers 11 adapted to engage and move the ears of corn along to the butt cutter. The conveyer chains pass around chain wheels 12 on shafts 13, 14 at opposite ends of the feed table and the upper runs of the chains travel in guide channels in the feed table A. The feed conveyer can be driven by any suitable means. The ears of corn are placed by hand on the feed table or conveyer in rear of the conveyer fingers and are carried by the fingers in a sidewise position past the butt cutter.

E represents bent spring strips which are secured at one end to a bridge or yoke 15 extending crosswise over the feed table. These strips extend rearwardly beneath the bridge over the feed table and hold the ears of corn down upon the feed table against the conveyer teeth as they are moved forwardly by the conveyer. These presser springs are preferably provided at their free rear ends with depending teeth 16 adapted to engage the husks to tear or loosen them on the ears so that the husks will be more readily removed by the husking rolls or devices.

All the parts above described are common in corn husking machines and may be of the construction shown and described or of any other suitable construction.

A gage or guide extends lengthwise along the feed table at that side of the conveyer adjacent to the butt cutter and against which the shoulders of the ears of corn are adapted to be placed so that the ears will be presented to the butt cutter in position to have the butts cut at the proper points close to the kernels. The gage preferably consists of an endless chain F arranged so that the run thereof which is engaged in the ears is adapted to travel toward the butt cutter substantially parallel with the feed conveyer. The butt ends of the ears of corn are adapted to rest against and travel with the gage chain F whereby resistance to the movement of the butt ends of the ears is avoided or reduced and the ears are prevented from being swung out of their crosswise position on the conveyer by engagement with the gage. As shown, this gage chain passes around wheels 17, 18, mounted to turn horizontally on a base plate 19 which is secured on the feed table so that it can be adjusted nearer to, or farther from the vertical plane of the butt cutter, as by screws 20 passing through the elongated slots in the base plate. The chain wheel 17 is journaled on a bearing piece 21 which is movably mounted on the base plate and is acted upon by a spring 21ª for tensioning the chain. 22 is a guide rib which holds the guiding run of the chain straight or from deflection and 23 is a removable cover plate for the parts mounted on the base plate. The shaft 24 of the other chain wheel 18 extends through an opening 25 in the feed table and is provided below the table with a toothed wheel 26 meshing with a gear wheel 27 for driving the gage chain, see Figs. 7–9. The opening 25 preferably extends to the edge of the feed table to enable the base plate 19 with the parts assembled thereon to be readily slipped into place on the feed table and the gear wheel 27 is broad enough to permit the required adjustment of the gage toward or from the feed conveyer without disturbing the mesh of the wheels 26 and 27. The gear wheel 27 is secured to a shaft 28 which is journaled in a suitable bearing 29 beneath the feed table and is connected by a chain 30 and wheels 31, 32, to a toothed driving wheel 33 adapted to mesh with and be driven by the lower run of one of the conveyer chains C. The driving wheel 33 is journaled on a bearing arm 34 hung on the shaft 28 to swing toward and from the conveyer chain and is held yieldingly in mesh with the chain as by a suitable spring 35. The bearing arm 34 is preferably made adjustable in length, as shown in Figs. 8 and 11, to enable the driving wheel to be properly meshed with the conveyer chain. This mechanism provides convenient means by which the gage chain is positively driven, preferably at a slightly greater speed than the conveyer and permits the gage to be readily adjusted as necessary. If the resistance to the movement of the gage chain should become abnormal from any cause the driving wheel 33 can yield and permit the conveyer chain to ride over its teeth without turning the wheel, thereby preventing injury to the gage chain and its driving mechanism. While the gage chain is preferably mounted and driven as described it could be differently arranged and driven by other suitable means, or if desired, the gage chain could be left free so as to be moved with the ears by the engagement of the ears therewith.

G represents an ear-placing device for engaging the ears of corn as they are moved along by the feed conveyer and shifting them endwise, or transversely relative to the direction of travel of the feed conveyer over against the gage. This placing device, in the construction shown consists of a wheel or plate mounted to rotate or swing horizontally over the feed table and preferably having a plurality of arms $g$ which are adapted to be engaged by the fingers of the conveyer for turning or swinging the device in a horizontal plane, and each of these arms is provided with one or more, preferably two prongs or teeth $g'$ which project upwardly a short distance from the upper face of the arms and are adapted to engage the husks at the under sides of the ears of corn. The arms are also preferably provided at their leading edges with upwardly projecting convex-faced lugs $g^2$ which assume positions in rear of the tassel ends of the ears of corn for preventing them from swinging rearwardly away from the conveyer fingers. The positioning wheel can be rotatably mounted in any suitable manner, as for instance, by a shaft 36 which extends downwardly therefrom through a bearing 37 on the feed table. The wheel is pressed down against the face of the table to produce sufficient friction to prevent the wheel from turning too freely by a spring 39 surrounding the shaft 36 below the table. The tension of the spring can be regulated by adjusting the nut 40. 41 is a locking nut for the spring adjusting nut. The placing device is journaled on the feed table at such a point that its arms are adapted to extend over the adjacent chain of the feed conveyer so as to be engaged by the lugs of this chain. As the chain travels along, one of the lugs thereof engages one of the arms of the wheel G and turns the wheel a portion of a revolution, thereby bringing the next arm of the wheel into position to be engaged and moved by the next lug of the feed chain. The prongs of the placing device travel in circular paths which intersect the path of movement of the feed conveyer and, as the placing device is revolved, one of its arms is moved beneath the tassel end of each of the ears of corn being carried to the butt cutter by the conveyer, and the prongs $g'$ on the arm engaging the husks at the under side of the ear, will shift the ear endwise, or transversely of the conveyer, until it is arrested by the engagement of its shoulder with the gage F, unless the shoulder of the ear was already against the gage. This shifting of the ears of corn over against the gage occurs when the ears are beneath the high front end portions of the presser springs E, and as the ears are carried rearward beneath these springs the pressure of the springs on the ears of corn act to prevent them from being moved away from the gage by the prongs of the placing device G, during that portion of the travel of the prongs when they move outwardly away from the conveyer. This tendency of the prongs to draw the ears of corn away from the gage is not great, however, since the tapering of the tassel ends of the ears permit the prongs to clear the ears without shifting them. The prongs $g'$ preferably have abrupt outer sides and are rounded and beveled at their inner sides to enable them to more readily disengage the husks and lessen the tendency to draw the ears away from the gage. As the prongs of the placing device penetrate the husks of the ears more or less, they tear the husks somewhat and thus coöperate with the prongs of the presser springs E in tearing or loosening the husks in addition to their function of shifting the ears over against the gage.

Manifestly an ear placing device of other construction arranged to be moved by the feed conveyer in a direction to shift the ears transversely of the feed conveyer over against the gage, could be employed, and if desired a placing device operating on the principle described could be actuated in proper time with the conveyer by other suitable operating means.

42 represents a bent spring strip which is suitably secured at one end to the yoke 15, preferably by means of an adjustable support 43, and extends rearwardly beneath the yoke above the chain gage F. The spring strip is adapted to bear down on the stalks of the ears which project out over the guiding run of the chain and prevent the shoulders of the ears from being shoved crosswise over the gage F by the placing device G. A guide plate 44 secured to the free portion of the spring and curving or inclining downwardly toward the same, and provided on its sloping face with oblique guide grooves, ribs or edges $44^a$, serves to guide the stalks under the spring when the ears are shoved endwise toward the gage, in case the stalks should project upwardly above the elevation of the free portion of the spring. The stalks are adapted to engage these edges and roll against the same in the guiding action of the plate. This plate has an upright extension 45 which engages the spring support 43 and limits the extent to which the free end of the spring can be deflected laterally by the pressure of the ears thereon. The spring strip preferably inclines slightly inwardly toward the rear, so that it can be shoved outwardly slightly by the ears and will return and move the ears slightly back again to prevent them from being moved past the gage by the placing device. A laterally projecting pin 46 on the extension 45 is adapted to strike the support 43 to limit the upward deflection of the spring.

H, Figs. 3, 7 and 12, represents a stalk-lifting or directing device arranged adjacent to the inner side of the gage F for preventing the ends of the stalks from striking the gage in case they should extend down low enough to do this, as indicated in Fig. 12, and thus prevent the ears from being moved by the placing device to the intended position with their shoulders against the gage. This device, as shown, consists of a bar extending lengthwise beside the gage and having a pendant weight 46 which extends through a hole 47 in the feed table and normally holds the bar in the position shown in Fig. 12 in which the face 48 thereof slopes upwardly from the feed table toward the gage F. When an ear is being shoved endwise over to the gage, if the end of the stalk extends down below the plane of the top of the gage, it will strike the sloping face 48 and slide up the same onto the gage. When the ear has been moved over with its shoulder against the gage and is pressed down by the springs E and 42 the ear will rock the bar H until the upper edge of its face 48 is well below the plane of the top of the gage, thus allowing the shoulder of the ear to engage and be guided by the gage. After an ear is carried off of the lifting bar by the conveyer, the weight 46 will return the bar to its normal position ready to direct the next stalk up onto the gage. This device could be constructed and mounted in other ways so as to rock and lift the stalks in the manner indicated.

I, Figs. 1 and 13 represent short studs or prongs which project up from the feed table opposite the front end of the gage F. They are preferably provided on a thin plate 50 secured by a screw or otherwise on the table between the conveyer chains. If an ear of corn should be carried along in an oblique position with its tassel end advanced by the conveyer it would, when it engages the prongs I be turned into the proper position crosswise of the conveyer.

K represents similar studs or prongs for a similar purpose located in a position to engage the ear after its butt end engages the butt cutter B.

I claim as my invention:—

1. The combination of a butt cutter, a traveling conveyer for moving ears of corn to the butt cutter, a butt gage for the ears, and an ear placing device which moves in a path crossing the path of movement of the ears to the butt cutter for moving the ears transversely of the conveyer against the butt gage, said placing device having a part which engages the tassel ends of the ears for preventing the ears from turning out of a position crosswise of the conveyer.

2. The combination of a butt cutter, a traveling conveyer having projecting fingers for moving the ears of corn to the butt cutter, a butt gage at one side of the path of travel of the conveyer, and an ear placing device which moves in between the conveyer fingers for moving the ears transversely of the conveyer against the butt gage and has a part for preventing the tassel ends of the ears from swinging away from the conveyer fingers.

3. The combination of a butt cutter, a traveling conveyer having projecting fingers for moving the ears of corn to the butt cutter, a butt gage at one side of the path of travel of the conveyer, and an ear placing device which moves in a direction crossing the direction of travel of the conveyer and has a part adapted to engage the underside of the ears for moving them transversely of the conveyer against the butt gage and a part which projects up in rear of the ears for preventing the ears from swinging out of a position crosswise of the conveyer.

4. The combination of a butt cutter, a traveling conveyer for moving the ears of corn to the butt cutter, a butt gage at one side of the path of travel of the conveyer, and an ear placing device from which moves in between the conveyer and the ears in a path crossing the path of movement of the ears for moving the ears transversely of the conveyer against the butt gage, and has a part for preventing the ears from swinging out of a position crosswise of the conveyer.

5. The combination of a butt cutter, a traveling conveyer for moving the ears of corn to the butt cutter, a butt gage at one side of the path of travel of the conveyer, and an ear placing device which swings beneath the ears in a direction crossing the path of movement of the ears and has a prong adapted to engage the underside of the ears for moving the ears transversely of the conveyer against the butt gage, and a part which projects up in rear of the ears for preventing the ears from swinging out of a position crosswise of the conveyer.

6. The combination of a butt cutter, a traveling conveyer for moving ears of corn to the butt cutter, a butt gage comprising an endless flexible member arranged with one run thereof adapted to travel lengthwise with the conveyer in position to be engaged by the butt ends of the ears, and drive mechanism for said gage including a wheel which engages with and is driven by said ear conveyer.

7. The combination of a butt cutter, a traveling conveyer for moving ears of corn to the butt cutter, a butt gage comprising an endless flexible member arranged with one run thereof adapted to travel lengthwise with the conveyer in position to be engaged by the butt ends of the ears, and drive mechanism for said gage including a wheel which engages and is driven by said ear conveyer, and means for holding said wheel yieldingly in driving engagement with the conveyer.

8. The combination of a feed table, a butt cutter, a traveling conveyer for moving the ears of corn to the butt cutter having a portion thereof passing beneath the feed table, a butt gage comprising an endless flexible member arranged with one run thereof adapted to travel lengthwise with the conveyer in position to be engaged by the butt ends of the ears, and drive mechanism for said gage located beneath the feed table and operated by engagement with that portion of the conveyer which passes below the feed table.

9. The combination of a butt cutter, a traveling conveyer for moving ears of corn to the butt cutter, a butt gage comprising a member arranged to travel lengthwise with the conveyer in position to be engaged by the butt ends of the ears, and a plate arranged lengthwise above said gage and having a face sloping transversely downwardly toward the gage for guiding the butt ends of the ears to the gage.

10. The combination of a butt cutter, a traveling conveyer for moving ears of corn to the butt cutter, a butt gage comprising a member arranged to travel lengthwise with the conveyer in position to be engaged by the butt ends of the ears, means for moving the ears transversely of the conveyer to said gage, and a plate arranged lengthwise above said gage and having a face sloping transversely downwardly toward the gage for guiding the butt ends of the ears to the gage.

11. The combination of a butt cutter, a traveling conveyer for moving ears of corn to the butt cutter, a butt gage arranged lengthwise of the conveyer in position to be engaged by the butt ends of the ears, means for moving the ears transversely of the conveyer to said gage, and a plate arranged lengthwise above said gage and having a face sloping transversely downwardly toward the gage for guiding the butt ends of the ears to the gage.

12. The combination of a butt cutter, a traveling conveyer for moving ears of corn to the butt cutter, a butt gage arranged lengthwise of the conveyer in position to be engaged by the butt ends of the ears, means for moving the ears transversely of the conveyer to said gage, and a plate mounted lengthwise above said gage to yield upwardly, said plate having a face sloping transversely downwardly toward the gage for guiding the butt ends of the ears to the gage.

13. The combination of a butt cutter, a conveyer for moving ears of corn to the butt cutter, a butt gage arranged lengthwise of the conveyer in position to be engaged by the shoulders of the ears, and a device arranged adjacent to the gage for lifting the stalks of the ears up to the gage and adapted to be moved by the ears to permit the shoulders of the ears to rest against the gage.

14. The combination of a butt cutter, a conveyer for moving the ears of corn to the butt cutter, a butt gage arranged lengthwise of the conveyer in position to be engaged by the shoulders of the ears, and a device arranged adjacent to the gage and having a face normally inclined upwardly toward the gage for directing the stalks of the ears up onto the gage and which is adapted to be moved from the inclined position by the ears to permit the shoulders of the ears to rest against the gage.

15. The combination of a butt cutter, a conveyer for moving ears of corn to the butt cutter, a butt gage arranged lengthwise of the conveyer in position to be engaged by the shoulders of the ears, means for moving the ears transversely of the conveyer to said gage, and a device arranged adjacent to the gage and having a face normally inclining upwardly toward the gage for directing the stalks of the ears up onto the gage, and which is adapted to be moved from the inclined position by the ears to permit the shoulders of the ears to rest against the gage.

16. The combination of a butt cutter, a conveyer for moving ears of corn to the butt cutter, a butt gage arranged lengthwise of the conveyer in position to be engaged by the shoulders of the ears, means for moving the ears transversely of the conveyer to said gage, and a device mounted adjacent to the gage to swing on an axis extending lengthwise of the gage and having a face normally inclining upwardly toward the gage for directing the stalks of the ears up onto the gage and which is adapted to be swung by the ears to a position to permit the shoulders of the ears to rest against the gage.

17. The combination of a butt cutter, a conveyer for moving ears of corn to the butt cutter, a butt gage arranged lengthwise of the conveyer in position to be engaged by the butt ends of the ears, and a stationary device located in the path of movement of the ears adapted to engage the ears and if they are in an oblique position to turn them to a position transverse to the conveyer.

18. The combination of a butt cutter, a conveyer for moving ears of corn to the butt cutter, a butt gage arranged lengthwise of the conveyer in position to be engaged by the butt ends of the ears, and a projection located in the path of movement of the ears approximately opposite the front end of the gage and adapted to engage the ears, and if they are in an oblique position to turn them to a position transverse to the conveyer.

19. The combination of a butt cutter, a traveling conveyer for moving ears of corn to the butt cutter, a butt chain arranged to travel lengthwise with the conveyer in position to be engaged by the butt ends of the ears, and a plate arranged lengthwise above said chain and having a curved face sloping transversely downwardly toward the chain and provided with oblique edges which engage the stalks of the ears and guide them to the chain.

Witness my hand, this 7th day of April, 1916.

JOHN B. ZIMMERMAN.

Witnesses:
C. W. PARKER,
M. J. PITMAN.

Copies of this patent may be obtained for five cents each, by addressing the "Commissioner of Patents, Washington, D. C."